(12) United States Patent
VanAntwerp et al.

(10) Patent No.: US 11,498,536 B2
(45) Date of Patent: Nov. 15, 2022

(54) SYSTEMS, VEHICLES, AND METHODS FOR TRAILER SWAY CONTROL

(71) Applicant: Toyota Motor Engineering & Manufacturing North America, Inc., Plano, TX (US)

(72) Inventors: Adam VanAntwerp, Chelsea, MI (US); Corey Zwegers, Dexter, MI (US); Stephen Robertson, Surprise, AZ (US); Takayuki Goto, Yokohama (JP); Yuichi Shimizu, Okazaki (JP)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 303 days.

(21) Appl. No.: 16/263,241

(22) Filed: Jan. 31, 2019

(65) Prior Publication Data

US 2020/0247371 A1    Aug. 6, 2020

(51) Int. Cl.
| | |
|---|---|
| *B60T 8/17* | (2006.01) |
| *B60T 8/1755* | (2006.01) |
| *B60T 7/20* | (2006.01) |
| *B60T 8/174* | (2006.01) |
| *G05D 1/08* | (2006.01) |

(52) U.S. Cl.
CPC .............. *B60T 8/1708* (2013.01); *B60T 7/20* (2013.01); *B60T 8/174* (2013.01); *B60T 8/17551* (2013.01); *B60T 2230/06* (2013.01); *B60T 2250/03* (2013.01); *B60T 2270/30* (2013.01); *G05D 1/0891* (2013.01)

(58) Field of Classification Search
None
See application file for complete search history.

(56) References Cited

U.S. PATENT DOCUMENTS

| | | | |
|---|---|---|---|
| 3,886,339 A * | 5/1975 | Jubenville | B60T 8/248 200/61.45 M |
| 4,196,936 A * | 4/1980 | Snyder | B60T 8/248 188/112 A |
| 6,068,352 A * | 5/2000 | Kulkarni | B60T 7/20 303/124 |
| 7,272,481 B2 | 9/2007 | Einig et al. | |
| 8,010,252 B2 | 8/2011 | Getman et al. | |

(Continued)

FOREIGN PATENT DOCUMENTS

AU      2016204948 A1 * 7/2016

*Primary Examiner* — Christian Chace
*Assistant Examiner* — Scott R Jagolinzer
(74) *Attorney, Agent, or Firm* — Dinsmore & Shohl LLP (57) ABSTRACT

A system for a vehicle and a trailer connected to the vehicle is provided. The system includes a trailer brake output circuit configured to output a trailer brake output signal, and an electronic control unit. The electronic control unit is configured to determine whether a value of a yaw rate of the trailer connected to the vehicle becomes greater than a threshold value, change a yaw rate oscillation counter in response to determining that the value of the yaw rate of the trailer becomes greater than the threshold value, instruct the trailer brake output circuit to output the trailer brake output signal to the trailer in response to the yaw rate oscillation becoming a first value, and activate trailer sway control in response to the yaw rate oscillation becoming a second value. The second value is greater than the first value.

19 Claims, 4 Drawing Sheets

(56) References Cited

U.S. PATENT DOCUMENTS

| | | |
|---|---|---|
| 8,165,770 B2 | 4/2012 | Getman et al. |
| 8,326,054 B2 | 12/2012 | Wu et al. |
| 8,483,911 B2 | 7/2013 | Reich |
| 8,746,812 B2* | 6/2014 | Albright ............ B60T 7/20 |
| | | 303/123 |
| 8,862,357 B2 | 10/2014 | Miyata |
| 9,238,483 B2 | 1/2016 | Hafner et al. |
| 9,834,187 B2 | 12/2017 | Englert et al. |
| 2008/0177454 A1 | 7/2008 | Bond et al. |
| 2009/0105906 A1* | 4/2009 | Hackney ............ B60W 30/02 |
| | | 701/38 |
| 2009/0198425 A1* | 8/2009 | Englert ............ B60D 1/30 |
| | | 701/70 |
| 2011/0029210 A1* | 2/2011 | Wu ............ B60D 1/58 |
| | | 701/70 |
| 2015/0210254 A1* | 7/2015 | Pieronek ............ B60W 10/18 |
| | | 701/70 |
| 2017/0240125 A1* | 8/2017 | Weigert ............ B60Q 1/34 |
| 2017/0361834 A1* | 12/2017 | Paskus ............ B60T 8/1755 |
| 2018/0079394 A1 | 3/2018 | Cekola et al. |
| 2019/0001944 A1* | 1/2019 | Ying ............ B60T 8/17551 |
| 2020/0391711 A1* | 12/2020 | Nitta ............ B60T 8/17551 |

* cited by examiner

SYSTEMS, VEHICLES, AND METHODS FOR TRAILER SWAY CONTROL

TECHNICAL FIELD

The present specification generally relates to trailer brake control systems and, more specifically, to systems for providing a trailer brake control output prior to activating a towing vehicle trailer sway control (TSC) system to aid in controlling a yaw of a trailer.

BACKGROUND

Trailers (e.g., recreational trailers, utility trailers, boat trailers, semi-trailers, and the like) may be towed by towing vehicles (e.g., automobiles and trucks). Some trailers include trailer brakes that may be actuated by a trailer brake controller coupled to the towing vehicle. The trailer brake controller may control the trailer brakes via an electric-over-hydraulic trailer braking system or an electric trailer braking system.

An electric-over-hydraulic trailer braking system includes hydraulic trailer brakes and an electric-over-hydraulic brake actuator coupled to the trailer that receives electrical signals from the trailer brake controller and facilitates the application of the hydraulic trailer brakes.

An electric trailer braking system includes electric trailer brakes that are applied when the trailer brake controller provides an electric current to the trailer brakes. The electric trailer brakes typically include brake shoes that frictionally engage a drum when activated. In some electric trailer braking system, an electromagnet is mounted on one end of a lever in order to actuate the brake shoes. When an electric current is applied to the electromagnet, the lever is pivoted as the electromagnet is drawn against the rotating brake drum, thereby actuating the electric trailer brakes.

SUMMARY

In one embodiment, a system for a vehicle and a trailer connected to the vehicle is provided. The system includes a trailer brake output circuit configured to output a trailer brake output signal, and an electronic control unit. The electronic control unit includes one or more processors; one or more memory modules; and machine readable instructions stored in the one or more memory modules that, when executed by the one or more processors, cause the electronic control unit to: determine whether a value of a yaw rate becomes greater than a threshold value; change a yaw rate oscillation counter in response to determining that the value of the yaw rate becomes greater than the threshold value; instruct the trailer brake output circuit to output the trailer brake output signal to the trailer in response to the yaw rate oscillation counter becoming a first value; and activate a towing vehicle trailer sway control mode in response to the yaw rate oscillation counter becoming a second value, the second value being different from the first value.

In another embodiment, a vehicle includes a trailer brake output circuit configured to output a trailer brake output signal to a trailer connected to the vehicle, and an electronic control unit. The electronic control unit is configured to determine whether a value of a yaw rate becomes greater than a threshold value; change a yaw rate oscillation counter in response to determining that the value of the yaw rate becomes greater than the threshold value; instruct the trailer brake output circuit to output the trailer brake output signal in response to the yaw rate oscillation counter becoming a first value; and activate a towing vehicle trailer sway control mode in response to the yaw rate oscillation counter becoming a second value, the second value being different from the first value.

In yet another embodiment, a method for controlling sway of a trailer connected to a vehicle is provided. The method includes determining, by an electronic control unit of the vehicle, whether a value of a yaw rate becomes greater than a threshold value; increasing, by the electronic control unit of the vehicle, a yaw rate oscillation counter in response to determining that the value of the yaw rate becomes greater than the threshold value; instructing, by the electronic control unit of the vehicle, a trailer brake output circuit of the vehicle to output a trailer brake output signal to the trailer in response to the yaw rate oscillation counter becoming a first value; and activating, by the electronic control unit of the vehicle, a towing vehicle trailer sway control mode in response to the yaw rate oscillation counter becoming a second value, the second value being different from the first value.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
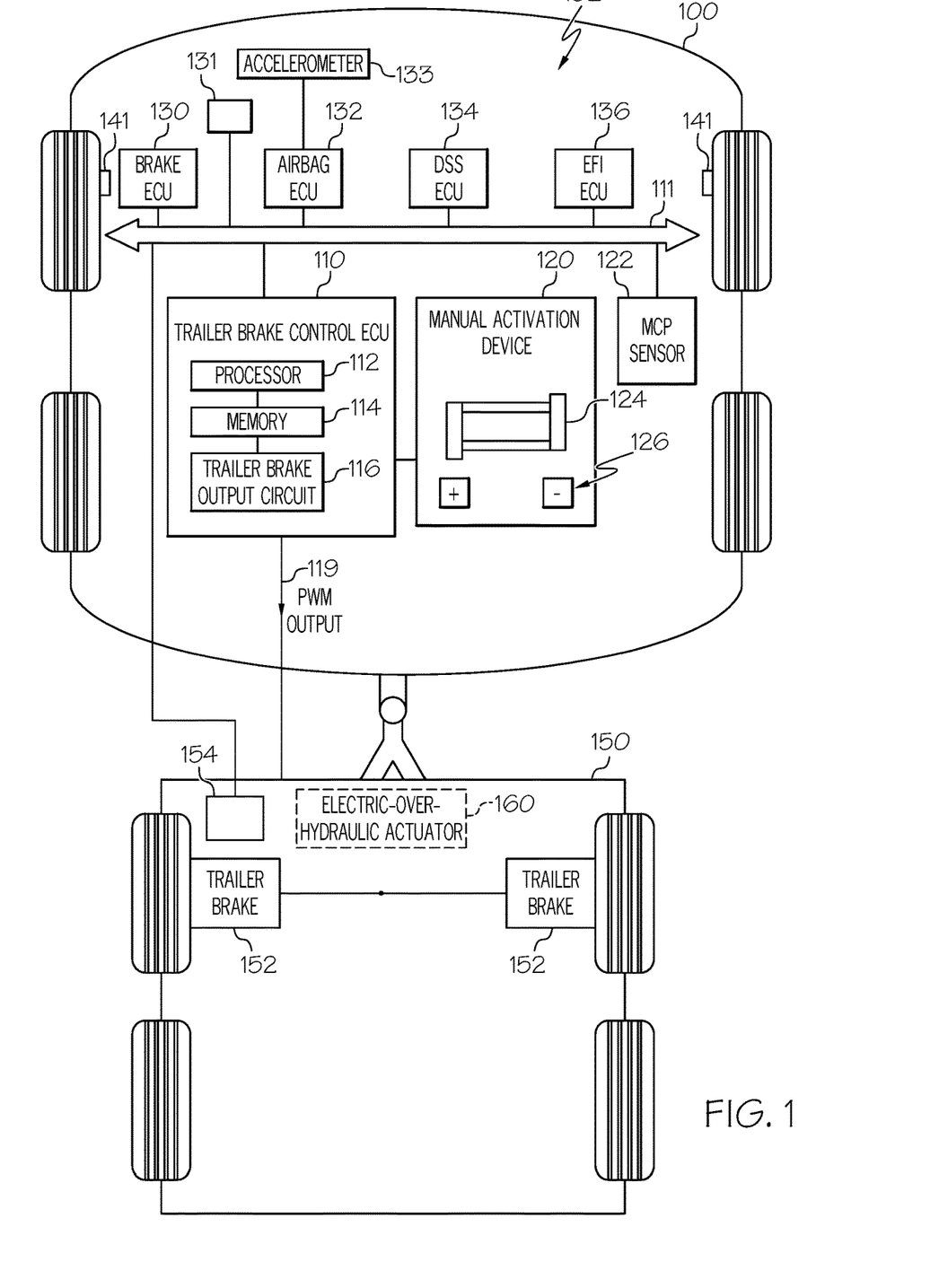
FIG. 1 schematically depicts a vehicle including a trailer brake control system coupled to a trailer including trailer brakes, according to one or more embodiments shown and described herein.
Figure 3:
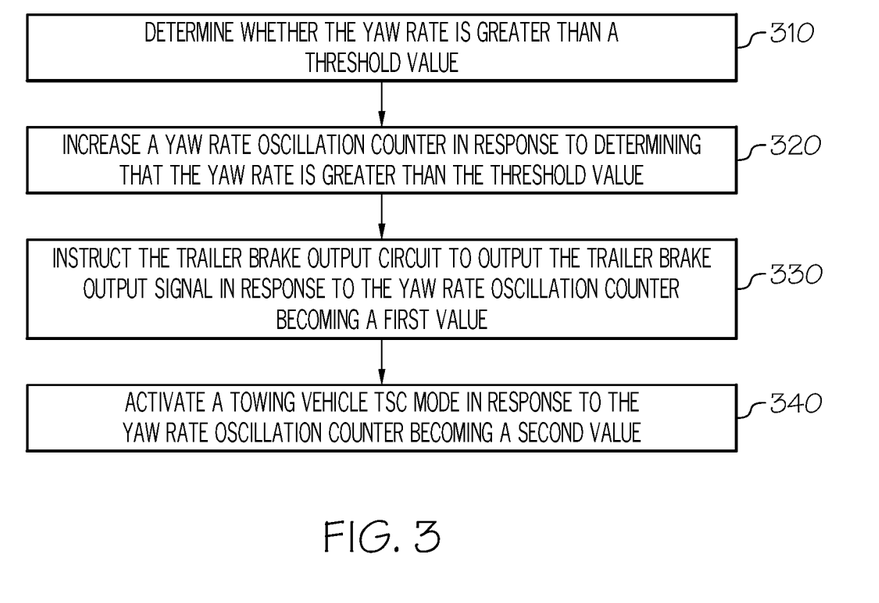
FIG. 3 depicts a flowchart of a method for controlling trailer sway, according to one or more embodiments shown and described herein.
Figure 4:
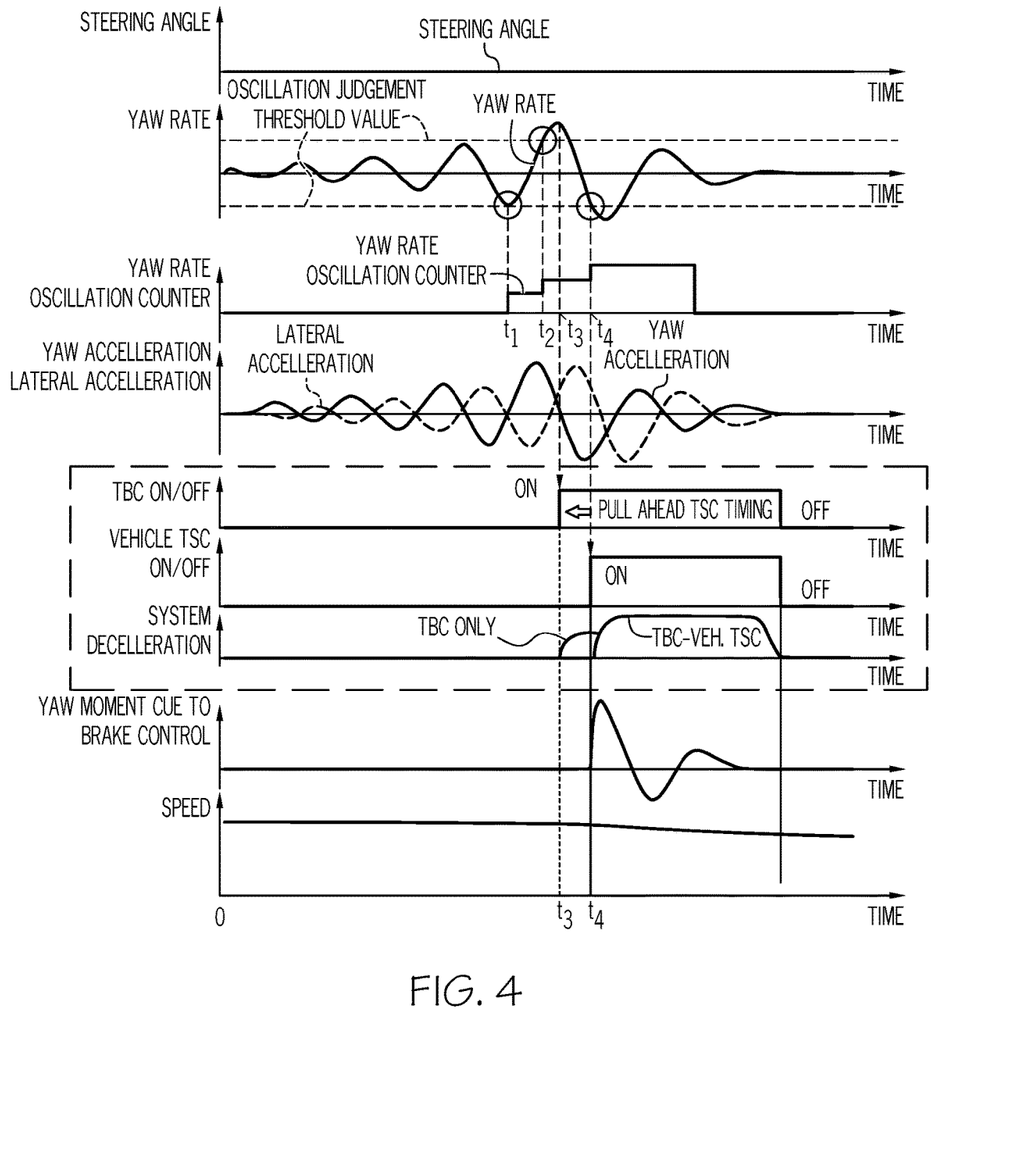
FIG. 4 depicts graphs illustrating operations of trailer brake control and trailer sway control functions based on the yaw rate of a trailer, according to one or more embodiments shown and described herein.

The embodiments disclosed herein include systems for controlling sway of a trailer connected to a vehicle. Referring generally to FIGS. 1, 3, and 4, a system for a vehicle and a trailer connected to the vehicle includes a trailer brake output circuit configured to output a trailer brake output signal, and an electronic control unit. The electronic control unit includes one or more processors, one or more memory modules, and machine readable instructions stored in the one or more memory modules that, when executed by the one or more processors, cause the electronic control unit to: determine whether a value of a yaw rate becomes greater than a threshold value, change a yaw rate oscillation counter in response to determining that the value of the yaw rate becomes greater than the threshold value, instruct the trailer brake output circuit to output the trailer brake output signal to the trailer in response to the yaw rate oscillation counter becoming a first value, and activate a trailer sway control in response to the yaw rate oscillation counter becoming a second value. The second value is greater than the first value. According to the present disclosure, the electronic control unit applies a supplemental braking force by trailer brakes before the towing vehicle trailer sway control mode is activated (e.g., which may result in the application of the towing vehicle brakes). This supplemental braking force puts tension between the vehicle and the trailer, and thus, reduces sway of the trailer before a towing vehicle trailer sway control mode is activated or a towing vehicle applies its brakes. The various systems for controlling sway of a trailer will be described in more detail herein with specific reference to the corresponding drawings.

Referring now to FIG. 1, an embodiment of a towing vehicle 100 including a system 102 for controlling an application of a plurality of trailer brakes 152 of a trailer 150 connected to the towing vehicle 100 is schematically depicted. The towing vehicle 100 may be an automobile or any other passenger or non-passenger vehicle such as, for example, a tractor or a tractor truck. In some embodiments, the towing vehicle 100 may be an autonomous vehicle.

The trailer 150 may be any unpowered vehicle including one or more wheels capable of being pulled by the towing vehicle 100 such as, for example, a recreational trailer, a utility trailer, a boat trailer, a semi-trailer, and the like. As depicted in FIG. 1, the plurality of trailer brakes 152 includes two trailer brakes, one coupled to each wheel of the front axle. However, it should be understood that in other embodiments, the plurality of trailer brakes 152 may include more than two trailer brakes, such as in embodiments in which the plurality of trailer brakes 152 includes multiple axles with two trailer brakes associated with each axle. In some embodiments in which the trailer 150 employs an electric-over-hydraulic braking system, the plurality of trailer brakes 152 may be a plurality of hydraulic trailer brakes and the trailer 150 may include an electric-over-hydraulic actuator 160 that receives an electrical activation signal from the system 102 and transforms the received electrical activation signal to a hydraulic pressure that activates the plurality of hydraulic trailer brakes, as will be described in further detail below. In embodiments in which the trailer 150 employs an electric braking system, the plurality of trailer brakes 152 may be a plurality of electric trailer brakes and the trailer 150 may not include the electric-over-hydraulic actuator 160.

The system 102 includes a communication path 111, a trailer brake control electronic control unit (ECU) 110, a brake ECU 130, an airbag ECU 132, a vehicle yaw rate sensor 131, an accelerometer 133, a driving support system (DSS) ECU 134, an electronic fuel injection (EFI) ECU 136, a manual activation device 120, a master cylinder pressure sensor 122, and towing vehicle brakes 141. The trailer brake control ECU 110 includes one or more processors 112, one or more memory modules 114, and a trailer brake output circuit 116. The various components of the system 102 and the interaction thereof will be described in detail below.

The communication path 111 may be formed from any medium that is capable of transmitting a signal such as, for example, conductive wires, conductive traces, optical waveguides, or the like. Moreover, the communication path 111 may be formed from a combination of mediums capable of transmitting signals. In one embodiment, the communication path 111 comprises a combination of conductive traces, conductive wires, connectors, and buses that cooperate to permit the transmission of electrical data signals to components such as processors, memories, sensors, input devices, output devices, and communication devices. Accordingly, the communication path 111 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium. The communication path 111 communicatively couples the various components of the system 102. As used herein, the term "communicatively coupled" means that coupled components are capable of exchanging data signals with one another such as, for example, electrical signals via conductive medium, electromagnetic signals via air, optical signals via optical waveguides, and the like.

The trailer brake control ECU 110 receives input from other ECUs (e.g., the brake ECU 130, the Airbag ECU 132, the DSS ECU 134, the EFI ECU 136), the manual activation device 120, the vehicle yaw rate sensor 131, and/or the master cylinder pressure (MCP) sensor 122, and outputs a trailer brake output signal 119, e.g., a pulse-width modulation signal, based on the received input.

Each of the one or more processors 112 of the trailer brake control ECU 110 may be any device capable of executing machine readable instructions. Accordingly, each of the one or more processors 112 may be a controller, an integrated circuit, a microchip, a computer, or any other computing device. The one or more processors 112 are communicatively coupled to the other components of the system 102 by the communication path 111. Accordingly, the communication path 111 may communicatively couple any number of processors with one another, and allow the components coupled to the communication path 111 to operate in a distributed computing environment. Specifically, each of the components may operate as a node that may send and/or receive data.

Each of the one or more memory modules 114 of the system 102 is coupled to the communication path 111 and communicatively coupled to the one or more processors 112. The one or more memory modules 114 may comprise RAM, ROM, flash memories, hard drives, or any device capable of storing machine readable instructions such that the machine readable instructions can be accessed and executed by the one or more processors 112. The machine readable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable instructions and stored on the one or more memory modules 114. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring to FIG. 1, the trailer brake output circuit 116 is coupled to the communication path 111 and communicatively coupled to the one or more processors 112. In embodiments in which the trailer 150 employs an electric trailer braking system, the trailer brake output circuit 116 is electrically coupled to the plurality of trailer brakes 152 by a conductive medium, such as a conductive wire. In embodiments in which the trailer 150 employs an electric-over-hydraulic braking system, the trailer brake output circuit 116 is electrically coupled to the electric-over-hydraulic actuator 160 by a conductive medium, such as a conductive wire. The trailer brake output circuit 116 is controlled by the one or more processors 112 and supplies a trailer brake output signal, such as a voltage or current, directly to the plurality of trailer brakes 152 (in embodiments in which the trailer 150 employs an electric braking system) or to the electric-over-hydraulic actuator 160 (in embodiments in which the trailer 150 employs an electric-over-hydraulic braking system) via the conductive medium when commanded by the one or more processors 112. The trailer brake output signal may be controlled based on one or more signals output by the manual activation device 120, a signal output by the MCP sensor 122, a signal output by the vehicle yaw rate sensor 131, and/or one or more signals output by the brake ECU 130, the Airbag ECU 132, the DSS ECU 134, and/or the EFI ECU 136. In some embodiments, the trailer brake output circuit 116 may supply current from the power system of the towing vehicle 100. The trailer brake output circuit 116 generally includes one or more electrical components, such as resistors, capacitors, transistors, inductors, and the like. In some embodiments, the trailer brake output circuit 116 may include at least one power transistor, such as a MOSFET transistor.

Still referring to FIG. 1, in some embodiments, the trailer brake output circuit 116 outputs a trailer brake output signal in response to a pulse-width modulated trailer brake output command signal having a duty cycle. In such embodiments, the trailer brake output circuit 116 may generate the trailer brake output signal in proportion to the duty cycle of the pulse-width modulated trailer brake output command signal. However, it should be understood that in other embodiments, the trailer brake output circuit 116 may output the trailer brake output signal in response to a trailer brake output command signal having a waveform other than a pulse-width modulated waveform.

Still referring to FIG. 1, the manual activation device 120 includes a slider 124 and gain pushbuttons 126. The manual activation device 120 is configured to output a signal including a position of the slider 124 and activation of the gain pushbuttons 126. In some embodiments, the output signal of the manual activation device 120 is received by the trailer brake control ECU 110, which may generate a trailer brake output signal with the trailer brake output circuit 116 based on the position of the slider 124 and/or a system gain determined based on activation of the gain pushbuttons 126. A driver of the towing vehicle 100 may demand greater trailer brake control output by increasing the gain set by the slider 124 and/or the gain pushbuttons 126.

Still referring to FIG. 1, the master cylinder pressure (MCP) sensor 122 is coupled to the communication path 111 and communicatively coupled to the trailer brake control ECU 110. The trailer brake control ECU 110 may control the trailer brake output circuit 116 based on a master cylinder pressure determined by the brake ECU 130 based on an output of the MCP sensor 122. A driver of the towing vehicle 100 may demand greater trailer brake control output by pressing the brake pedal, which is sensed by the MCP sensor 122.

The trailer 150 includes a trailer yaw rate sensor 154. The trailer yaw rate sensor 154 is communicatively coupled to the communication path 111. The trailer yaw rate sensor 154 measures the yaw rate of the trailer 150 and transmits the yaw rate to the brake ECU 130 or the trailer brake control ECU 110 through the communication path 111. The towing vehicle 100 includes a vehicle yaw rate sensor 131. The vehicle yaw rate sensor 131 is communicatively coupled to the communication path 111. The vehicle yaw rate sensor 131 measures the yaw rate of the towing vehicle 100 and transmits the yaw rate to the brake ECU 130 or the trailer brake control ECU 110 through the communication path 111.

The brake ECU 130 is communicatively coupled to the communication path 111. The brake ECU 130 is configured to control activation of the vehicle brakes. The brake ECU 130 is configured to transmit a trailer sway control (TSC) flag indicating that a towing vehicle TSC mode is active or a TSC flag indicating that a towing vehicle TSC mode is inactive to the trailer brake control ECU 110. The trailer brake control ECU 110 operates under a TSC mode or non-TSC mode based on the TSC flag received from the brake ECU 130. The brake ECU 130 may include one or more processors similar to one or more processors 112 of the trailer brake control ECU 110 and one or more memory modules similar to one or memory modules 114 of the trailer brake control ECU 110. The trailer brake control ECU 110 may instruct the trailer brake output circuit 116 of the trailer brake control ECU 110 to output a trailer brake output signal to the trailer 150. In some embodiments, the brake ECU 130 and the trailer brake control ECU 110 may be integrated into a signal ECU.

In embodiments, the brake ECU 130 may receive the yaw rate of the towing vehicle 100 from the vehicle yaw rate sensor 131 and monitor whether the absolute value of the towing vehicle yaw rate becomes greater than a threshold value. The brake ECU 130 increases a yaw rate oscillation counter in response to determining that the absolute value of the yaw rate of the towing vehicle 100 becomes greater than the threshold value.

In embodiments, the brake ECU 130 may receive the yaw rate of the trailer 150 from a trailer yaw rate sensor 154 and monitor whether the absolute value of the trailer yaw rate becomes greater than a threshold value. The brake ECU 130 increases a yaw rate oscillation counter in response to determining that the absolute value of the yaw rate of the trailer 150 becomes greater than the threshold value.

The yaw rate oscillation counter may be stored in the one or more memory modules in the brake ECU 130 or in the memory modules 114 of the trailer brake control ECU 110. The details of the yaw rate oscillation counter are described below with reference to FIG. 3. If the yaw rate oscillation counter becomes a first value (e.g., two), the brake ECU 130 may instruct the trailer brake output circuit 116 of the trailer brake control ECU 110 to output a trailer brake output signal before the towing vehicle 100 enters a TSC mode where the towing vehicle 100 may apply its brakes. If the yaw rate oscillation counter becomes a second value which is greater the second value (e.g., three), the brake ECU 130 may enter a towing vehicle trailer sway control mode where the brake ECU 130 activates the towing vehicle brakes 141 and sends a TSC flag indicating that the towing vehicle 100 is in the towing vehicle TSC mode to the trailer brake control ECU 110.

The airbag ECU 132 is communicatively coupled to the communication path 111 and to the accelerometer 133. The airbag ECU 132 is configured to control activation of the airbag and to transmit a vehicle acceleration message to other components of the towing vehicle 100 via the communication path 111. The accelerometer 133 is a device configured to generate an output signal proportional to vehicle acceleration or deceleration. The airbag ECU 132 determines the vehicle acceleration message to transmit to the communication path 111 based on the output signal of the accelerometer 133. In some embodiments, zero point logic may be employed to the accelerometer value to decrease variability in the sensor value, such as by determining an accelerometer value when a driver is judged to begin braking (e.g., based on master cylinder pressure), and then determining future accelerometer values relative to the accelerometer value when the driver began braking. The airbag ECU 132 may include one or more processors similar to one or more processors 112 of the trailer brake control ECU 110 and one or more memory modules similar to one or memory modules 114 of the trailer brake control ECU 110.

The DSS ECU 134 is communicatively coupled to the communication path 111. The DSS ECU 134 is configured to transmit a PCS flag indicating that a vehicle PCS mode is active to the trailer brake control ECU 110 when precollision safety function is activated, or transmit a PCS flag indicating that a vehicle PCS mode is inactive to the trailer brake control ECU 110 when a pre-collision safety function is deactivated. The trailer brake control ECU 110 operates under a PCS mode or non-PCS mode based on the PCS flag received from the DSS ECU 134. The DSS ECU 134 may include one or more processors similar to one or more processors 112 of the trailer brake control ECU 110 and one or more memory modules similar to one or memory modules 114 of the trailer brake control ECU 110.

The EFI ECU 136 is communicatively coupled to the communication path 111. The EFI ECU 136 is configured to transmit an adaptive cruise control (ACC) flag indicating that a vehicle ACC mode is active, or an ACC flag indicating that a vehicle ACC mode is inactive to the trailer brake control ECU 110, such that the trailer brake control ECU 110 operates under a ACC mode or non-ACC mode. The EFI ECU 136 may include one or more processors similar to one or more processors 112 of the trailer brake control ECU 110 and one or more memory modules similar to one or memory modules 114 of the trailer brake control ECU 110.

Figure 2A:
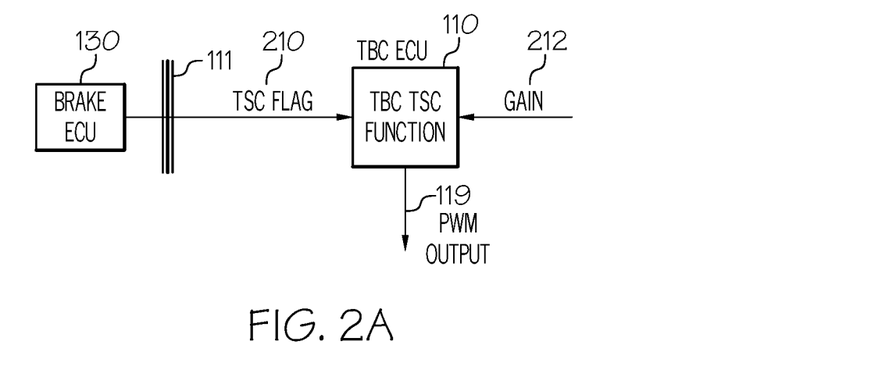
FIG. 2A schematically depicts operations of a trailer brake control ECU when a towing vehicle trailer sway control (TSC) mode is activated, according to one or more embodiments shown and described herein.
Figure 2B:
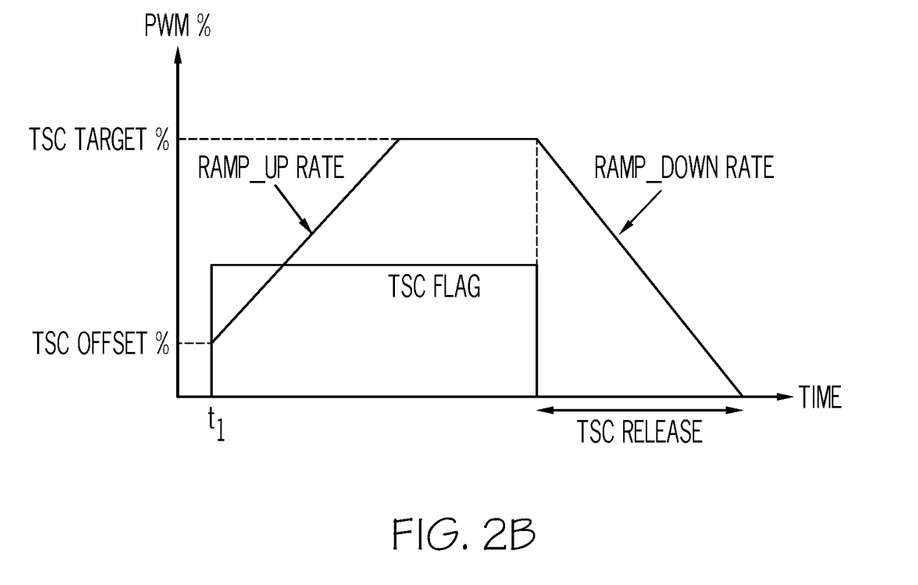
FIG. 2B depicts a graph illustrating the change of a trailer brake control target output when the towing vehicle TSC mode is activated, according to one or more embodiments shown and described herein.

FIG. 2A schematically depicts operations of the trailer brake control ECU 110 when a trailer brake control (TBC) trailer sway control (TSC) function is activated. The TBC TSC function mitigates sway of the trailer being towed by a vehicle. In some embodiments, when the TSC function is activated, the operation of trailer brakes is smooth and prevents an abrupt feeling. In embodiments, the brake ECU 130 sends a TSC flag 210 indicating that a towing vehicle TSC mode is ON when the yaw rate oscillation counter becomes a second value which is greater than the first value (e.g., a second value of three greater than a first value of two). The trailer brake control ECU 110 receives the TSC flag 210 from the brake ECU 130. When the TSC mode is ON, the trailer brake control ECU 110 outputs a trailer brake output signal 119 based on a TSC function target output. For example, as shown in FIG. 2B, when the vehicle TSC mode is ON at time $t_1$, the percentage of pulse width modulation increases to a TSC target percentage at a rate of RAMP_UP RATE as shown in FIG. 2B. Once the percentage of pulse width modulation reaches the TSC target percentage, it is maintained at the TSC target percentage until the TSC flag is OFF. When the TSC flag is OFF, the percentage of pulse width modulation decreases at a rate of RAMP-DOWN RATE as shown in FIG. 2B. The TSC target percentage may be a function of a gain 212 that may be received from the manual activation device 120. In some embodiments, the gain 212 may be pre-stored in the one or more memory modules 114 of the trailer brake control ECU 110.

FIG. 3 depicts a flowchart for outputting a TBC signal prior to activating a towing vehicle TSC mode, according to one or more embodiments shown and described herein.

In step 310, the brake ECU 130 determines whether the yaw rate becomes greater than a threshold value. In embodiments, the brake ECU 130 may determine whether the absolute value of the yaw rate becomes greater than a threshold value. In some embodiments, the yaw rate is a yaw rate of the vehicle received from the vehicle yaw rate sensor 131. In some embodiments, the yaw rate is a yaw rate of the trailer 150 received from the trailer yaw rate sensor 154. In some embodiments, the yaw rate is a yaw rate of the vehicle-trailer combination calculated based on a signal received from the trailer yaw rate sensor 154 of the trailer 150 and/or a signal received form the vehicle yaw rate sensor 131. The threshold value may be a predetermined value stored in the brake ECU 130 or other memory modules communicatively coupled to the communication path 111. For example, FIG. 4 shows a graph illustrating the yaw rate and a threshold value. From time $t=0$ to time $t=t_1$, a degree of oscillation of the yaw rate increases. At time $t=t_1$, the absolute value of the yaw rate becomes greater than the threshold value or reaches the threshold value. Similarly, at times $t=t_2$ and $t=t_3$, the absolute value of the yaw rate becomes greater than the threshold value.

In some embodiments, the brake ECU 130 determines whether the yaw rate becomes greater than an upper threshold or the yaw rate becomes smaller than a lower threshold. The absolute values of the upper threshold and the lower threshold may be the same.

In step 320, the brake ECU 130 increases a yaw rate oscillation counter in response to determining that the yaw rate becomes greater than the threshold value. In embodiments, the brake ECU 130 increases the yaw rate oscillation counter in response to determining that the absolute value of the yaw rate becomes greater than the threshold value. For example, by referring to FIG. 4, at time $t=t_1$, the absolute value of the yaw rate becomes greater than the threshold value. Then, the brake ECU 130 increase the yaw rate oscillate counter from 0 to 1 as shown in FIG. 4. At time $t=t_2$, the absolute value of the yaw rate becomes greater than the threshold value, and the brake ECU 130 increases the yaw rate oscillate counter from 1 to 2. Similarly, at time $t=t_3$, the absolute value of the yaw rate becomes greater than the threshold value, and the brake ECU 130 increases the yaw rate oscillate counter from 2 to 3.

In some embodiments, the brake ECU 130 increases the yaw rate oscillation counter in response to determining that the yaw rate becomes greater than an upper threshold or the yaw rate becomes smaller than a lower threshold. For example, by referring to FIG. 4, at time $t=t_1$, the yaw rate becomes smaller than the lower threshold. Then, the brake ECU 130 increase the yaw rate oscillation counter from 0 to 1 as shown in FIG. 4. At time $t=t_2$, the yaw rate becomes greater than the upper threshold, and the brake ECU 130 increases the yaw rate oscillation counter from 1 to 2. Similarly, at time $t=t_3$, the yaw rate becomes smaller than the lower threshold value, and the brake ECU 130 increases the yaw rate oscillation counter from 2 to 3.

In step 330, the brake ECU 130 instructs the trailer brake output circuit to output the trailer brake output signal in response to the yaw rate oscillation counter becoming a first value. In embodiments, the brake ECU 130 instructs the trailer brake output circuit to output the trailer brake output signal when the trailer yaw rate peaks after the yaw rate oscillation counter becomes the first value. For example, by referring to FIG. 4, the brake ECU 130 instructs the trailer brake output circuit to output the trailer brake output signal at t=$t_3$ when the trailer yaw rate peaks after the yaw rate oscillation counter becomes two. That is, the graph illustrating TBC ON/OFF control in FIG. 4 shows that TBC is ON at time t=$t_3$. In some embodiments, the brake ECU 130 may instruct the trailer brake output circuit to output the trailer brake output signal when the yaw rate oscillation counter becomes the first value. For example, the brake ECU 130 may instruct the trailer brake output circuit to output the trailer brake output signal at time t=$t_2$. The TBC may be off when the absolute value of the yaw rate becomes less than a threshold value or substantially zero as shown in FIG. 4.

In response to receiving the trailer brake output signal from the trailer brake control ECU 110, the trailer 150 operates the trailer brakes 152, and tension is provided between the towing vehicle 100 and the trailer 150 in response to the operation of the trailer brakes 152. The tension reduces the trailer sway before a trailer sway control is activated or a towing vehicle applies its brakes. In response to the TBC being on during time period between $t_3$ and $t_4$, the system decelerates according to the TBC as shown in FIG. 4 illustrating system deceleration.

In step 340, the brake ECU 130 activates the towing vehicle TSC mode in response to the yaw rate oscillation counter becoming a second value. The second value is greater than the first value. In the towing vehicle TSC mode, the brake ECU 130 activates the brakes of the towing vehicle 100. For example, by referring to FIG. 4, the brake ECU 130 switches on the towing vehicle TSC flag at t=$t_4$ when the yaw rate oscillation counter becomes three. That is, the graph illustrating VEHICLE TSC ON/OFF control in FIG. 4 shows that TSC is ON at time t=$t_4$. The towing vehicle TSC mode may be off when the absolute value of the yaw rate becomes less than a threshold value or substantially zero as shown in FIG. 4. As shown in FIG. 4, the TBC is on prior to the towing vehicle TSC mode being on (and accompanying application of the towing vehicle brakes 141). In response to the TSC being on after $t_4$, the system decelerates according to the TSC as well as the TBC as shown in FIG. 4 illustrating system deceleration.

In embodiments, the brake ECU 130 may determine whether the absolute value of the yaw rate does not exceed the threshold value for a predetermined time. If the absolute value of the yaw does not exceed the threshold value for the predetermined time, then the brake ECU 130 may reset the yaw rate oscillation counter to zero. For example, the brake ECU 130 may set the yaw rate oscillation counter to zero in response to determination that the absolute value of the yaw rate does not exceed the threshold value for a predetermined time after time t=$t_4$.

While the embodiment above describes that trailer brake output is provided when the yaw rate oscillation counter becomes two and that the towing vehicle TSC mode is activated when the yaw rate oscillation counter becomes three, the trailer brake output may be provided and towing vehicle TSC mode may be activated at different times. For example, in some embodiments, the trailer brake output is provided when the yaw rate oscillation counter becomes one and that the towing vehicle TSC mode is activated when the yaw rate oscillation counter becomes two. As another example, trailer brake output is provided when the yaw rate oscillation counter becomes three and that the towing vehicle TSC mode is activated when the yaw rate oscillation counter becomes four. As another example, the trailer brake output is provided when the yaw rate oscillation counter becomes two and that the towing vehicle TSC mode is activated when the yaw rate oscillation counter becomes four.

In some embodiments, the yaw rate oscillation counter may decrease in response to determining that the absolute value of the yaw rate becomes greater than the threshold value. For example, a default value of the yaw rate oscillation counter may be three. When the absolute value of the yaw rate becomes greater than the threshold value at time t=$t_1$ as shown in FIG. 4, the yaw rate oscillation counter decreases from three to two. Similarly, when the absolute value of the yaw rate becomes greater than the threshold value at time t=$t_2$ as shown in FIG. 4, the yaw rate oscillation counter decreases from two to one. Similarly, when the absolute value of the yaw rate becomes greater than the threshold value at time t=$t_3$ as shown in FIG. 4, the yaw rate oscillation counter decreases from one to zero. The brake ECU 130 may instruct the trailer brake output circuit to output the trailer brake output signal in response to the yaw rate oscillation counter becoming a first value, and activate TSC in response to the yaw rate oscillation counter becoming a second value. For example, the first value may be two, and the second value may be one. Once the yaw rate oscillation counter becomes zero, the yaw rate oscillation counter may be reset to the default value (e.g., three) if the absolute value of the yaw rate does not exceed the threshold value for a predetermined time.

In some embodiments, a system may determine whether the absolute value of the yaw rate of the towing vehicle 100 becomes greater than a threshold value. The system receives the yaw rate of the towing vehicle 100 from the vehicle yaw rate sensor 131. The brake ECU 130 increases a yaw rate oscillation counter in response to determining that the absolute value of the yaw rate of the towing vehicle 100 becomes greater than the threshold value. The brake ECU 130 instructs the trailer brake output circuit to output the trailer brake output signal in response to the yaw rate oscillation counter becoming a first value. And then, the brake ECU 130 activates TSC in response to the yaw rate oscillation counter becoming a second value.

It should now be understood that embodiments described herein provide systems for controlling trailer sway. The system determines whether a value of a yaw rate becomes greater than a threshold value, changes a yaw rate oscillation counter in response to determining that the value of the yaw rate becomes greater than the threshold value, instructs the trailer brake output circuit to output the trailer brake output signal to the trailer in response to the yaw rate oscillation counter becoming a first value, and activates a towing trailer sway control mode in response to the yaw rate oscillation counter becoming a second value. The second value is greater than the first value. According to the present disclosure, the electronic control unit applies a supplemental braking force by trailer brakes before the trailer sway control is activated. This supplemental braking force puts tension between the vehicle and the trailer, and thus, reduces sway of the trailer before a trailer sway control is activated or a towing vehicle applies its brakes.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for a vehicle and a trailer connected to the vehicle, the system comprising:
    a trailer brake output circuit configured to output a trailer brake output signal; and
    an electronic control unit programmed to:
        determine whether a value of a yaw rate becomes greater than a threshold value;
        change a yaw rate oscillation counter at a time of the value of the yaw rate becoming greater than the threshold value;
        instruct the trailer brake output circuit to output the trailer brake output signal to the trailer without activating a towing vehicle trailer sway control mode at a time of the yaw rate peaking after the yaw rate oscillation counter becomes a first value such that a brake of the trailer is activated prior to a brake of the vehicle; and
        activate the towing vehicle trailer sway control mode that sets a trailer sway control target percentage and activate the brake of the vehicle in response to the yaw rate oscillation counter becoming a second value, the second value being different from the first value.

2. The system of claim 1, wherein the electronic control unit is further configured to:
    increase the yaw rate oscillation counter in response to determining that the value of the yaw rate becomes greater than the threshold value.

3. The system of claim 2, wherein the second value is greater than the first value.

4. The system of claim 1, wherein:
    the electronic control unit is further configured to decrease the yaw rate oscillation counter in response to determining that the value of the yaw rate becomes greater than the threshold value; and
    the second value is smaller than the first value.

5. The system of claim 1, wherein the electronic control unit is further configured to:
    instruct the trailer brake output circuit to output the trailer brake output signal in response to the value of the yaw rate peaking after the yaw rate oscillation counter becomes the first value.

6. The system of claim 1, wherein the value of the yaw rate is an absolute value of the yaw rate.

7. The system of claim 6, wherein the electronic control unit is further configured to:
    determine whether the absolute value of the yaw rate does not exceed the threshold value for a predetermined time; and
    reset the yaw rate oscillation counter to zero in response to determining that the absolute value of the yaw rate does not exceed the threshold value for the predetermined time.

8. The system of claim 1, wherein the electronic control unit is further configured to:
    determine whether the value of the yaw rate becomes smaller than a lower threshold; and
    increase the yaw rate oscillation counter in response to determining that the value of the yaw rate becomes smaller than the lower threshold.

9. The system of claim 1, wherein:
    the vehicle includes a yaw rate sensor configured to measure the yaw rate; and
    the electronic control unit is further configured to receive the value of the yaw rate from the yaw rate sensor.

10. The system of claim 1, wherein the trailer sway control target percentage is higher than a trailer sway control percentage set when the towing vehicle trailer sway control mode is off.

11. The system of claim 10, wherein the trailer sway control target percentage is a target pulse width modulation percentage.

12. The system of claim 11, wherein a pulse width modulation of the trailer brake output signal increases up to the target pulse width modulation percentage while the towing vehicle trailer sway control mode is activated.

13. The system of claim 11, wherein the target pulse width modulation percentage is a function of a gain from a manual activation device of the vehicle.

14. A vehicle comprising:
    a trailer brake output circuit configured to output a trailer brake output signal to a trailer connected to the vehicle; and
    an electronic control unit configured to:
        determine whether a value of a yaw rate becomes greater than a threshold value;
        change a yaw rate oscillation counter at a time of the value of the yaw rate becoming greater than the threshold value;
        instruct the trailer brake output circuit to output the trailer brake output signal without activating a towing vehicle trailer sway control mode at a time of the yaw rate peaking after the yaw rate oscillation counter becomes a first value such that a brake of the trailer is activated prior to a brake of the vehicle; and
        activate the towing vehicle trailer sway control mode that sets a trailer sway control target percentage and activate the brake of the vehicle in response to the yaw rate oscillation counter becoming a second value, the second value being different from the first value.

15. The vehicle of claim 14, wherein:
    the electronic control unit is configured to increase the yaw rate oscillation counter in response to determining that the value of the yaw rate becomes greater than the threshold value; and
    the second value is greater than the first value.

16. The vehicle of claim 14, wherein the value of the yaw rate is an absolute value of the yaw rate.

17. The vehicle of claim 16, wherein the electronic control unit is configured to:
    determine whether the absolute value of the yaw rate does not exceed the threshold value for a predetermined time; and
    reset the yaw rate oscillation counter to zero in response to determining that the absolute value of the yaw rate does not exceed the threshold value for the predetermined time.

18. A method for controlling sway of a trailer connected to a vehicle, the method comprising:

determining, by an electronic control unit of the vehicle, whether a value of a yaw rate becomes greater than a threshold value;

increasing, by the electronic control unit of the vehicle, a yaw rate oscillation counter at a time of the value of the yaw rate becoming greater than the threshold value;

instructing, by the electronic control unit of the vehicle, a trailer brake output circuit of the vehicle to output a trailer brake output signal to the trailer without activating a towing vehicle trailer sway control mode at a time of the yaw rate peaking after the yaw rate oscillation counter becomes a first value such that a brake of the trailer is activated prior to a brake of the vehicle; and activating, by the electronic control unit of the vehicle, the towing vehicle trailer sway control mode that sets a trailer sway control target percentage and activating the brake of the vehicle in response to the yaw rate oscillation counter becoming a second value, the second value being different from the first value.

19. The method of claim 18, wherein instructing the trailer brake output circuit to output the trailer brake output signal in response to the yaw rate oscillation counter becoming the first value comprises:

instructing the trailer brake output circuit to output the trailer brake output signal in response to the yaw rate peaking after the yaw rate oscillation counter becomes the first value.

\* \* \* \* \*

UNITED STATES PATENT AND TRADEMARK OFFICE
CERTIFICATE OF CORRECTION

| | |
|---|---|
| PATENT NO. | : 11,498,536 B2 |
| APPLICATION NO. | : 16/263241 |
| DATED | : November 15, 2022 |
| INVENTOR(S) | : Adam VanAntwerp et al. |

It is certified that error appears in the above-identified patent and that said Letters Patent is hereby corrected as shown below:

On the Title Page

Item (72), inventor 4, city, delete "Yokohama" and insert --Yokohoma-shi, Kanagawa-ken--, therefor.

Item (72), inventor 5, city, delete "Okazaki" and insert --Okazaki-shi, Aichi-ken--, therefor.

Signed and Sealed this
Fourteenth Day of February, 2023

Katherine Kelly Vidal
*Director of the United States Patent and Trademark Office*